United States Patent [19]

Willgohs et al.

[11] 3,999,033
[45] Dec. 21, 1976

[54] ARC WELDING TORCH HAVING A FLEXIBLE WIRE GUIDE ASSEMBLY

[75] Inventors: Ralph Hugo Willgohs, Downers Grove, Ill.; Donald Joseph Mikalsen, Carmel, N.Y.; Ralph Bertram Grenville Yeo, Riverside, Conn.

[73] Assignee: Union Carbide Corporation, New York, N.Y.

[22] Filed: Feb. 25, 1975

[21] Appl. No.: 552,995

[52] U.S. Cl. .......................... 219/130; 138/DIG. 8; 219/75
[51] Int. Cl.² .......................................... B23K 9/00
[58] Field of Search .............. 219/130, 75; 138/DIG. 8, 130, 131, 134; 174/128 R

[56] References Cited
UNITED STATES PATENTS

| | | | |
|---|---|---|---|
| 472,611 | 4/1892 | Stanley | 138/131 |
| 625,917 | 5/1899 | Arnold | 138/134 |
| 1,953,915 | 4/1934 | Burgett | 138/134 X |
| 2,211,790 | 8/1940 | Pile | 174/128 R |
| 2,817,749 | 12/1957 | Flood | 219/130 |
| 3,158,730 | 11/1964 | Hill | 219/75 |
| 3,755,648 | 8/1973 | Rothman | 219/130 |

*Primary Examiner*—E. A. Goldberg
*Attorney, Agent, or Firm*—John R. Doherty

[57] ABSTRACT

The flexible wire guide assembly of the torch is located between the torch body and the nozzle assembly and includes at least two layers of helically wound multistrand conductor circumferentially arranged in concentric relation to form an annular passageway for a moving electrode. The layers are contained within an inner and outer extension spring which cooperate during the application of a bending force to restrain the layers from bulging inwardly or outwardly respectively. The outer spring is held in lateral compression with its turns spaced a predetermined distance apart.

9 Claims, 3 Drawing Figures

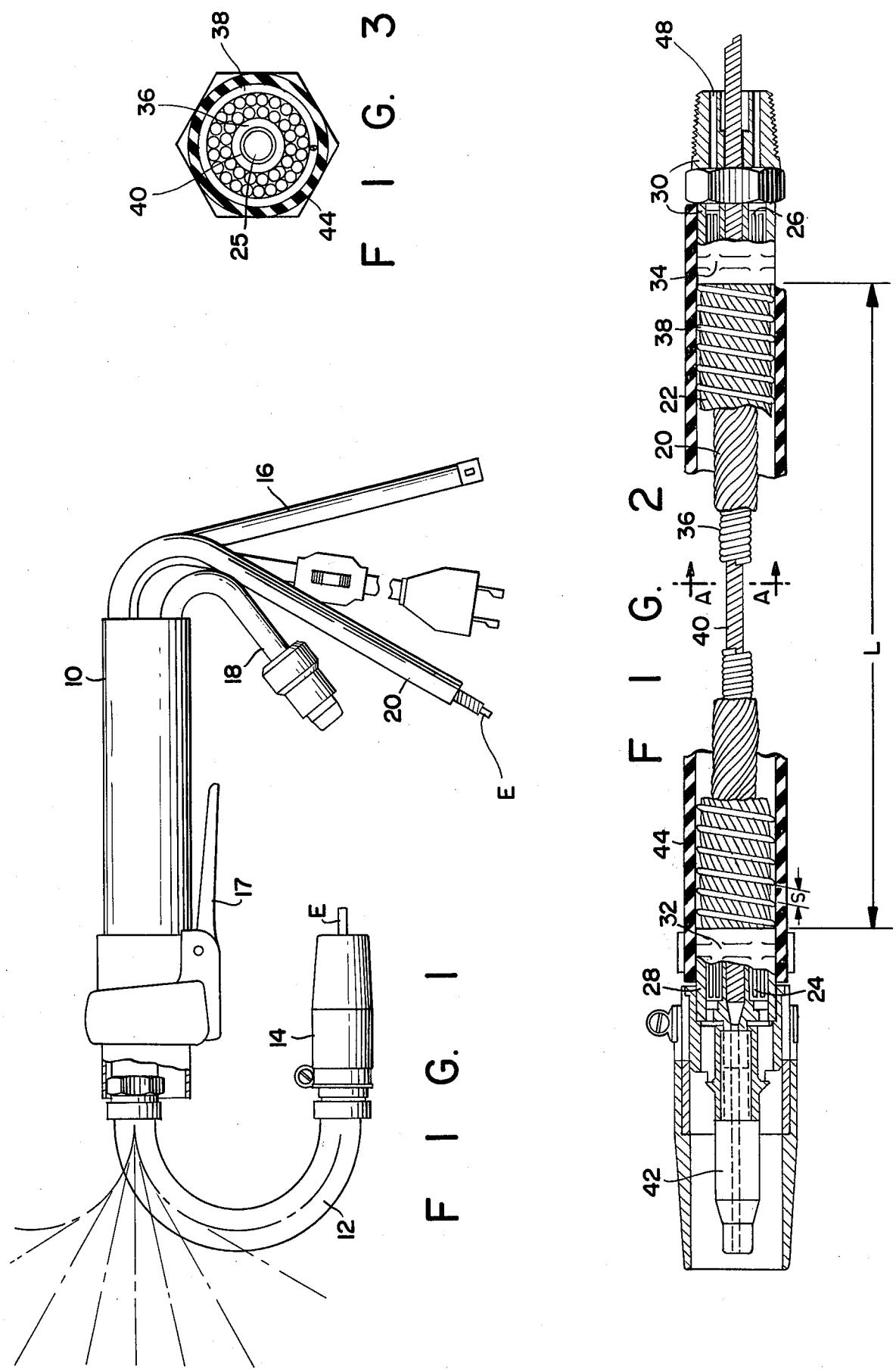

ARC WELDING TORCH HAVING A FLEXIBLE WIRE GUIDE ASSEMBLY

This invention relates to gas shielded metal arc torches through which a consumable electrode is driven under the control of a welding operator.

BACKGROUND

In certain instances the welding operator is confronted with limited access to the weld location requiring the operator to awkwardly position the torch in order to perform the welding operation. An obvious solution to this problem would be to use a flexible guide which is manipulatable into any position for guiding the direction of the electrode wire through the nozzle of the welding torch where current is supplied to the electrode before it contacts the weld joint. A flexible extension for use in conjunction with a nonconsumable welding electrode gas shielded arc torch is shown and described in U.S. Pat. No. 3,158,730 which issued on Nov. 24, 1964 to C. W. Hill and entitled Gas Shielded Arc Torch. The flexible assembly described therein consists of a bundle of elongated flexible solid metal wires which extend in a spiral configuration between the torch body and the nozzle. The bundle of wires provide flexibility as well as perform the function of transmitting current from the torch body to the nonconsumable electrode located within the nozzle. The specification teaches how to correlate the number of strands and size of flexible wires needed to achieve a high degree of rigidity at any chosen angular position with desirable life and weight characteristics. This teaching can be directly employed in the design of a gas shielded consumable electrode arc torch by using the flexible neck region of the torch as a conduit to provide passage for a movable electrode as well to provide control over its direction. A straight forward design would simply involve arranging the bundle of strands of wire around a cylindrical sleeve innerliner which would form an annular passageway for the electrode. Such a design would not, however, adequately account for any tendency of the multiple strands of wire and innerliner to kink or crimp during bending of the flexible neck. The effect of such kinking or crimping would be to greatly increase the feed forces required to drive the electrode through the torch body.

One design directed specifically to a consumable electrode flexible wire guide attachment for a gas shielded torch and which is intended to minimize the tendency of the wire guide to kink during bending is shown and described in U.S. Pat. No. 3,755,648 issued on Aug. 28, 1973 and entitled Flexible Welding Nozzle Apparatus. The patent describes a flexible wire guide consisting of a twisted bundle of wire strands arranged about a steel spring which forms the bore through which the electrode passes. The wire strands are constrained by an outer glass tape support sleeve. The tape sleeve is intended to prevent the coiled strands from spreading during bending whereas the spring liner is intended to applied a radially outward force to maintain the circularity of the bore. Apparently whatever benefit is derived from the constraint placed on the windings comes only at the expense of flexibility in manipulating the wire guide attachment. The greater the constraint the less flexible the guide becomes and the greater the increase in spring back from a bent position.

SUMMARY OF THE INVENTION

The present invention is an improvement over the design in the aforementioned U.S. Pat. No. 3,755,648, taking advantage of the teachings in the earlier described U.S. pat. No. 3,158,730 to provide a torch with a readily flexible wire guide assembly capable of universal angular and lateral disposition but without experiencing kinking or crimping in a bent position.

The metal inert gas shielded arc torch of the present invention in its broadest aspect comprises a body through which a consumable electrode is driven, a nozzle assembly having means in electrical contact with the electrode and an elongated flexible wire guide assembly of predetermined length extending from said body to said nozzle assembly for controlling the direction of the moving electrode through the nozzle; the wire guide assembly comprising:

at least two layers of solid metal wire each consisting of a multiple number of strands of wire secured at the ends thereof to said body and said nozzle assembly respectively, said layers of wire being circumferentially arranged in concentric relation for forming an annular passageway with at least one of said layers having a helical geometry;

means for restraining said layers of solid metal wire including a first support spring disposed within said annular passageway abutting said layers of wire with its turns spaced close together, a second support spring surrounding said layers of wire and means for maintaining said second support spring in compression with a spacing between turns equal to 10–25% of the spring wire diameter so that said layers of wire upon the application of a bending force will tend to slide relative to one another to form a continuous curve with a given minimum radius of curvature; and a flexible insulating outer jacket enclosing said layers of solid metal wire and said first and second support spring.

OBJECTS

Accordingly, it is the main object of the present invention to provide a metal arc gas welding torch having a readily flexible wire guide assembly capable of universal adjustment without kinking and flattening during bending.

Other objects and advantages will become apparent from the following description when read in connection with the accompanying drawings in which:

FIG. 1 is an exterior view of a gas metal arc welding torch illustrating the movable angular positions of the flexible neck wire guide assembly of the present invention;

FIG. 2 is a side view of longitudinal section of the torch and wire guide assembly of FIG. 1 with the guide assembly broken to illustrate its internal parts; and FIG. 3 is an elevation taken along the lines A—A in FIG. 2.

DESCRIPTION OF THE INVENTION

The torch shown in FIGS. 1 to 3 inclusive comprises a body 10, a flexible wire guide assembly 12 and a nozzle assembly 14. The torch body 10 is of conventional construction housing a power cable 16 adapted for connection to a power supply (not shown), a gas supply conduit 18 adapted for connection to a remote gas supply and a wire feed conduit 20. A consumable electrode welding wire E is fed through the wire feed conduit 20 from a remotely located spool of such wire (not shown). A switch handle 17, under the manual control of the welding operator, triggers the supply of gas, activates power and advances the electrode E. The electrode E passes through the torch body 10, The flexible wire guide assembly 12 and then through the nozzle assembly 14 from whence it exits the torch. The elongated flexible wire guide assembly 12 is detachable from the torch body 10 and from the nozzle assembly 14 respectively. The torch wire guide 12 as illustrated in FIG. 1 may be flexed from a horizontal attitude a full 180° or more and in any angular direction. The wire guide assembly 12 as will be explained in more detail hereafter is constructed so that upon the application of a bending force it will form a continuous curve from the body 10 to the nozzle assembly 14 without kinking or flattening. This is essential since the electrode E has little column strength and any obstruction in its path will prevent its passage. It is also an essential characteristic that once the guide assembly 12 is bent, it retain the bent configuration upon release of the bending force.

The detailed construction of the flexible wire guide assembly 12 is shown in FIGS. 2 and 3 and comprises at least a first and second layer of conductor 20 and 22 each extending from the torch body 10 to the nozzle assembly 14. Each layer of conductor 20 and 22 consists of a predetermined number of electrically conductive strands of flexible solid metal wire preferably of copper and of a predetermined wire size. The selection of the wire size and the number of strands of wire is interrelated and based upon meeting the mechanical characteristics of flexibility and rigidity and the electrical requirement that the combined layers have the proper current carrying capacity.

The inner layer of conductor 20 is spirally wrapped about a mandrel which is later removed to form the circular passageway 25. The direction of the spiral wind is unimportant although it is preferred that the outer layer 22 which surrounds the inner layer 20 also be helicallywound and in a direction opposite to the direction of wind of the inner layer 20. The opposite ends of each layer 20 and 22 are positioned within an annular space 24 and 26 located in the end fittings 28 and 30 respectively. The layers are then secured by crimping the end fittings at 32 and 34. The end fitting 28 connects the flexible wire guide assembly 12 to the nozzle assembly 14 whereas the end fitting 30 connects the flexible wire guide assembly 12 to the torch body 10. A coiled steel extension spring 36, having its turns spaced close together, preferably with the turns in contact, is disposed within the passageway 25. The spring 36 is of a diameter so that it fits snugly within the passageway 25 and is of a length approximately equal to the distance L between the crimped ends of end fittings 28 and 30. An outer coil steel spring 38 surrounds the layers of winding 20 and 22 and has a predetermined spacing S between its turns within a range of between 10–25% of the spring wire diameter. The spacing S shown in FIG. 2 is exaggerated for clarity and ease of illustration. The preferred technique to achieve the desired spacing S between the turn of spring 38 is to use a tightly wound extension spring, similar in type to spring 36, cutting it to a length equal to 10–25% less than length L and then stretching it into a free length which is greater than length L. The stretched spring 38 is then mounted over the layers of winding and laterally compressed before one of the end fittings 28 or 30 is attached. Thereafter the end fittings 28 and 30 maintain the spring in a state of compression. The diameter of the spring 38 should be sized to fit snugly about the outer layer of conductor 22. Although the inner and outer springs 36 and 38 are intended to abut the inner and outer layers 20 and 22 respectively, the springs need not, and preferably do not, apply any radial force against the layers for so long as the flexible wire guide assembly 12 is in the horizontal or unbent position. A third spring 40, preferably a flat wire spring, serves as the conduit for the electrode wire E. Although, the flat wire spring 40 need only extend for a distance equal to the length L of the wire guide assembly 12 it is highly preferred that the wire spring conduit 40 form a continuous liner extending back to the wire feed source through the wire feed conduit 20 as well as forward to within the nozzle assembly 14 up to the contact tip 42. A single liner provides continuity for the moving electrode E and reduces the frictional forces that would otherwise be developed by a transition from one liner to another. The wire guide assembly 12 is completed by enclosing the flexible layers of conductor 20 and 22 and the springs within a tubular jacket 44 of insulating material such as rubber and fastening the jacket 44 at both ends of the assembly to the end fittings 28 and 30.

During operation, power is conducted through the power cable 16 in a conventional manner into one end of the conductive end fitting 30 from where it passes through to the layers of conductor 20 and 22 respectively. The layers of conductor 20 and 22 in turn conduct power to the opposite end fitting 28 from where power is further transferred to the contact tip 42 of the nozzle assembly 14. Shielding gas is delivered from the supply conduit 18 through the torch body 10 whereupon it is fed through the annular passage 48 of the end fitting 30 into the annular space 26 traveling down the flexible wire guide assembly 12 through the intertices formed between the layers of conductor 20 and 22 and through the clearance spaces between such layers and the outer jacket 44. Upon reaching end fitting 28 the gas passes out from the annular space 24 into the nozzle assembly 14.

The position of the wire guide assembly 12 is manually adjustable from a horizontal position to an inclined or angular position by moving the nozzle assembly 14 relative to the torch body 10. Upon the application of a bending force the inner spring 36, having its turns in close contact, provides a uniform restraining force supporting the layers of winding 20 and 22 from bulging inwardly whereas the outer spring 38 tends to compress the layers 20 and 22 together and tends to restrain the layers 20 and 22 from bulging outwardly. The effect is to tightly sandwich the first and second layers of conductor 20 and 22 against one another so as to increase the sliding friction between the layers. The increased friction increases the resistance to further bending; increases the rigidity of the wire guide assembly 12 and reduces any tendency of the wire guide assembly 12 to springback. By using two or more layers of conductor 20 and 22 the rigidity of the wire guide assembly 12 is rendered dependent upon friction and not plastic deformation as would be the case with only one layer of conductor. It is also preferred as mentioned earlier to oppositely wind the layers 20 and 22 which increases the resistance to fatigue and provides greater torsional resistance. The outer spring 38 is held in compression to prevent axial shifting of the spring during bending. It also assures a uniform restraining force upon the layers of conductor over the length L of the wire guide assembly 12.

A 250 amp torch for use with 0.045 wire was designed following the principles of the present invention using a total of 38 strands of solid copper wire conductor of 0.051 inch diameter for the two layers of conductor 20 and 22 respectively with the inner conductor 20 wound with 16 strands of wire and the outer conductor 22 wound with 22 strands of wire. A length L of five inches was used with the wire guide assembly 12 designed for a minimum bend radius of one and a half inches.

It is to be understood that modifications and variations in design parameter are within the scope of the present invention as defined in the appended claims.

We claim:

1. In a metal inert gas shielded arc welding torch including a torch body through which a consumable electrode is driven, a nozzle assembly having means in electrical contact with said driven electrode and an elongated flexible wire guide assembly of predetermined length extending from said body to said nozzle assembly for controlling the direction of said driven electrode through said nozzle assembly wherein said flexible wire guide assembly includes a layer composed of electrically conductive strands of flexible solid metal wire helically wound together and forming a passageway, means for securing said electrically conductive layer to said torch body at one end and to said nozzle assembly at the other end thereof and a flexible insulating outer member enclosing said electrically conductive layer; the improvement for enhancing the capability of said flexible wire guide assembly for universal angular and lateral displacement without kinking and flattening in the bent position, said improvement comprising, in combination:
a second layer composed of electrically conductive strands of flexible solid metal wire helically wound together, said second layer being circumferentially arranged in concentric relation around the first layer and in abutting sliding frictional engagement therewith;
a first coiled support spring disposed within said passageway abutting said first layer and having its turns spaced closely together;
a second coiled support spring fitted snugly around said second layer and having its turns spaced a predetermined distance apart, the arrangement being such that said first and second layers upon the application of a bending force will tend to slide relative to one another but without bulging outwardly and forming a continuous curve with a given minimum radius of curvature; and
means for holding said second coiled support spring in a state of compression.

2. A torch as defined in claim 1 wherein the strands of flexible solid metal wire in said first and second layers are helically wound in opposing directions to one another.

3. A metal inert gas shielded arc welding torch comprising, in combination: a torch body through which a consumable electrode is driven, a nozzle assembly having means in electrical contact with said driven electrode and an elongated flexible wire guide assembly of predetermined length extending from said body to said nozzle assembly for controlling the direction of said driven electrode through said nozzle assembly, said wire guide assembly comprising:
an inner and at least one outer layer composed of electrically conductive strands of flexible solid metal wire, said inner and outer layers being circumferentially arranged in concentric relation and in abutting sliding frictional engagement with said inner layer forming a passageway, the strands of said inner and outer layers being helically wound in opposing directions to one another;
a first coiled support spring disposed within said passageway abutting said inner layer and having its turns spaced close together;
a second coiled support spring fitting snugly around said outer layer and having its turns spaced a predetermined distance apart, the arrangement being such that said inner and outer layers upon the application of a bending force will tend to slide relative to one another and form a continuous curve with a given minimum radius of curvature;
means for holding said second coiled support spring in a state of compression;
means for guiding said driven electrode through said passageway;
means for securing said inner and outer layers to said torch body at one end and to said nozzle assembly at the other end thereof; and
a flexible insulating outer member enclosing said inner and outer layers and said first and second coiled support springs.

4. A torch as defined in claim 3 wherein said second coiled support spring is made from spring wire having a given diameter and wherein said predetermined spacing between the turns of said second coiled support spring is equal to a distance within the range of 10–25% of said spring wire diameter.

5. A torch as defined in claim 3 wherein said electrode guide means comprises a third coiled spring disposed inside said first coiled support spring providing a continuous inner lining for said driven electrode.

6. A torch as defined in claim 5 wherein said third coiled spring extends at least through the full length of said torch body and also to within said nozzle assembly.

7. A torch as defined in claim 3 wherein said means for securing said inner and outer layers to said torch body and said nozzle assembly also holds said second coiled support spring in a state of compression.

8. A torch as defined in claim 3 wherein said flexible insulating outer member is composed of rubber.

9. A metal inert gas shielded arc welding torch comprising, in combination: a torch body through which a consumable electrode is driven, a nozzle assembly having means in electrical contact with said driven electrode and an elongated flexible wire guide assembly of predetermined length extending from said body to said nozzle assembly for controlling the direction of said driven electrode through said nozzle assembly, said wire guide assembly comprising:
an inner and an outer layer composed of electrically conductive strands of flexible solid metal wire, said inner and outer layers being circumferentially arranged in concentric relation and in abutting sliding frictional engagement with said inner layer forming a passageway, the strands of said inner and outer layers being helically wound in opposing directions to one another;
a first coiled support spring disposed within said passageway abutting said inner layer and having its turns spaced close together;

a second coiled support spring made from spring wire having a given diameter, said second coiled spring fitting snugly around said outer layer and having its turns spaced apart a distance within the range of 10–25% of said spring wire diameter, the arrangement being such that said inner and outer layers upon the application of a bending force will tend to slide relative to one another and form a continuous curve with a given minimum radius of curvature;

a third coiled spring disposed inside said first coiled support spring for providing a continuous inner lining for said driven electrode, said third coiled spring extending at least through the full length of said torch body and also to within said nozzle assembly;

means for securing said inner and outer layers to said torch body at one end and to said nozzle assembly at the other end thereof, said securing means also holding said second coiled spring in a state of compression; and a flexible insulating outer jacket enclosing said inner and outer layers and said first and second coiled support springs.

* * * * *